United States Patent
Abe (10) Patent No.: US 8,131,014 B2
(45) Date of Patent: Mar. 6, 2012

(54) OBJECT-TRACKING COMPUTER PROGRAM PRODUCT, OBJECT-TRACKING DEVICE, AND CAMERA

(75) Inventor: Hiroyuki Abe, Yokohama (JP)

(73) Assignee: Nikon Corporation, Tokyo (JP)

( * ) Notice: Subject to any disclaimer, the term of this patent is extended or adjusted under 35 U.S.C. 154(b) by 758 days.

(21) Appl. No.: 12/223,779

(22) PCT Filed: Feb. 13, 2007

(86) PCT No.: PCT/JP2007/052515
§ 371 (c)(1),
(2), (4) Date: Aug. 8, 2008

(87) PCT Pub. No.: WO2007/099762
PCT Pub. Date: Sep. 7, 2007

(65) Prior Publication Data
US 2009/0141936 A1  Jun. 4, 2009

(30) Foreign Application Priority Data

Mar. 1, 2006 (JP) .................. 2006-054394
Oct. 27, 2006 (JP) .................. 2006-292149

(51) Int. Cl.
*G06T 7/20* (2006.01)
(52) U.S. Cl. ..................................... 382/103
(58) Field of Classification Search .............. 382/103, 382/190, 209, 218; 348/222.1, 169
See application file for complete search history.

(56) References Cited

U.S. PATENT DOCUMENTS

| 2004/0136567 A1 * | 7/2004 | Billinghurst et al. ......... 382/103 |
| 2004/0179716 A1 | 9/2004 | Tafuku et al. |
| 2005/0031165 A1 * | 2/2005 | Olson et al. .................... 382/103 |
| 2008/0002860 A1 * | 1/2008 | Super et al. .................... 382/114 |
| 2008/0273800 A1 * | 11/2008 | Hatabu .......................... 382/209 |

FOREIGN PATENT DOCUMENTS

| JP | A-10-255057 | 9/1998 |
| JP | A-2001-060269 | 3/2001 |
| JP | A-2004-234494 | 8/2004 |
| JP | A-2005-346425 | 12/2005 |

* cited by examiner

*Primary Examiner* — Irakli Kiknadze
(74) *Attorney, Agent, or Firm* — Oliff & Berridge, PLC

(57) ABSTRACT

A computer performs following steps according to a program for tracking an object. Template matching of each frame of an input image to a plurality of template images is performed, a template image having a highest similarity with an image within a predetermined region of the input image is selected as a selected template among the plurality of template images and the predetermined region of the input image is extracted as a matched region. With reference to an image within the matched region thus extracted, by tracking motion between frames, motion of an object is tracked between the images of the plurality of frames. It is determined as to whether or not a result of template matching satisfies an update condition for updating the plurality of template images. In a case that the update condition is determined to be satisfied, at least one of the plurality of template images.

15 Claims, 7 Drawing Sheets

OBJECT-TRACKING COMPUTER PROGRAM PRODUCT, OBJECT-TRACKING DEVICE, AND CAMERA

TECHNICAL FIELD

A present invention relates to an object-tracking computer program product, an object-tracking device, and a camera which track an object across a plurality of frames.

BACKGROUND ART

A following object-tracking device is known. The object-tracking device first performs matching processing in which an input image to each frame is matched to each of a plurality of template images obtained at different times. Thereafter, a region of the input image that is matched most with the template images is designated as a template matching position. By updating the template matching position as a new template image, an object is tracked even if the shape, for example, of the object being tracked changes. (Refer to patent document 1)

Patent Document 1: Japanese Laid Open Patent Publication No. 2001-60269

DISCLOSURE OF THE INVENTION

Problems to be Solved by the Invention

However, since conventional object-tracking devices update a plurality of template images for each matching processing to input images of each frame, the template images may fluctuate wildly and stable template matching may not be carried out.

Means for Solving the Problems

According to a first aspect of the present invention, an object-tracking computer program product for tracking motion of an object between images of a plurality of frames that are input in chronological order stores a program with which following steps of (a) to (d) are to be executed on a computer:
(a) a step of template matching, wherein template matching of each frame of an input image to a plurality of template images is performed, a template image having a highest similarity with an image within a predetermined region of the input image is selected as a selected template among the plurality of template images and the predetermined region of the input image is extracted as a matched region;
(b) a step of object-tracking, wherein, with reference to an image within the matched region that is extracted in the step of template-matching, by tracking motion between frames, motion of an object is tracked between the images of the plurality of frames;
(c) a step of determining as to whether or not a result of matching in the step of template-matching satisfies an update condition for updating the plurality of template images; and
(d) a step of updating, in a case that the update condition is determined to be satisfied in the step of determining, at least one of the plurality of template images.

According to a second aspect of the present invention, in the object-tracking computer program product according to the first aspect, the plurality of template images includes a current selected template image that was selected as the selected template image when the plurality of template images were updated in the step of updating, a former selected template image that had been designated as the current selected template image until the plurality of template were updated in the step of updating, and a new template image which is an image within the matched region at a time that the plurality of template images were updated in the step of updating.

According to a third aspect of the present invention, in the object-tracking computer program product according to the second aspect, it is preferable that the plurality of template images are three template images that include each one of the current selected template image, the former selected template image, and the new selected template image.

According to a fourth aspect of the present invention, in the object-tracking computer program product according to the first aspect, it is preferable that the plurality of template images includes a current selected template image that was selected as the selected template image when the plurality of template images were updated in the step of updating, a former selected template image that had been designated as the current selected template image until the plurality of template were updated in the step of updating, a new template image which is an image within the matched region at a time that the plurality of template images were updated in the step of updating, and a non-update template image to be not updated in the step of updating, which was obtained first among the plurality of template images.

According to a fifth aspect of the present invention, in the object-tracking computer program product according to the fourth aspect, it is preferable that the plurality of template images are four template images that include each one of the current selected template image, the former selected template image, the new selected template image, and the non-update template image.

According to a sixth aspect of the present invention, in the object-tracking computer program product according to any of the second to fifth aspects, it is preferable that in the step of determining, it is determined as the update condition that one of the former selected template image and the new template image is consecutively selected a predetermined number of times or more as the selected template image.

According to a seventh aspect of the present invention, in the object-tracking computer program product according to any of the second to fifth aspects, it is preferable that in the step of determining, it is determined as the update condition that, when one of the former selected template image and the new template image is consecutively selected a predetermined number of times or more as the selected template image, either that values of similarity at that time are all equal to or greater than a predetermined value of similarity or that an average value of similarity at that time is equal to or greater than a predetermined value of similarity.

According to a eighth aspect of the present invention, in the object-tracking computer program product according to the fourth or fifth aspect, it is preferable that in the step of determining, it is determined as the update condition that, when one of the former selected template image, the new template image, and the non-update template image is consecutively selected a predetermined number of times or more as the selected template image, either that values of similarity at that time are all equal to or greater than a predetermined value of similarity or an average value of similarity at that time is equal to or greater than a predetermined value of similarity.

According to a ninth aspect of the present invention, in the object-tracking computer program product according to any of the first to eighth aspects, it is preferable that in the step of updating, only a predetermined proportion of pixels among all pixels of each template image is to be updated.

An object-tracking device according to a tenth aspect of the present invention includes a program execute unit that executes a program that is stored in the object-tracking computer program product according to any of the first to ninth aspects.

A camera according to a eleventh aspect of the present invention includes an imaging unit that images an object to obtain an image, and a program execute unit that executes a program that is stored in the object-tracking computer program product according to any one of the first to ninth aspects, wherein the program execute means executes the program such that motion of the object is tracked between images of a plurality of frames that are obtained by imaging the object by the imaging means and are input in chronological order.

It is to be noted that the program execute unit may be described as a program execute means and the imaging unit may be described as an imaging means.

Advantageous Effect of the Invention

According to the present invention, since template images are updated only if update conditions for template images are satisfied, stable template matching can be carried out while following changes such as in a shape of the object and reducing the number of updating the template images even in the case of using a plurality of template images.

BEST MODE FOR CARRYING OUT THE INVENTION

First Embodiment

Figure 1:
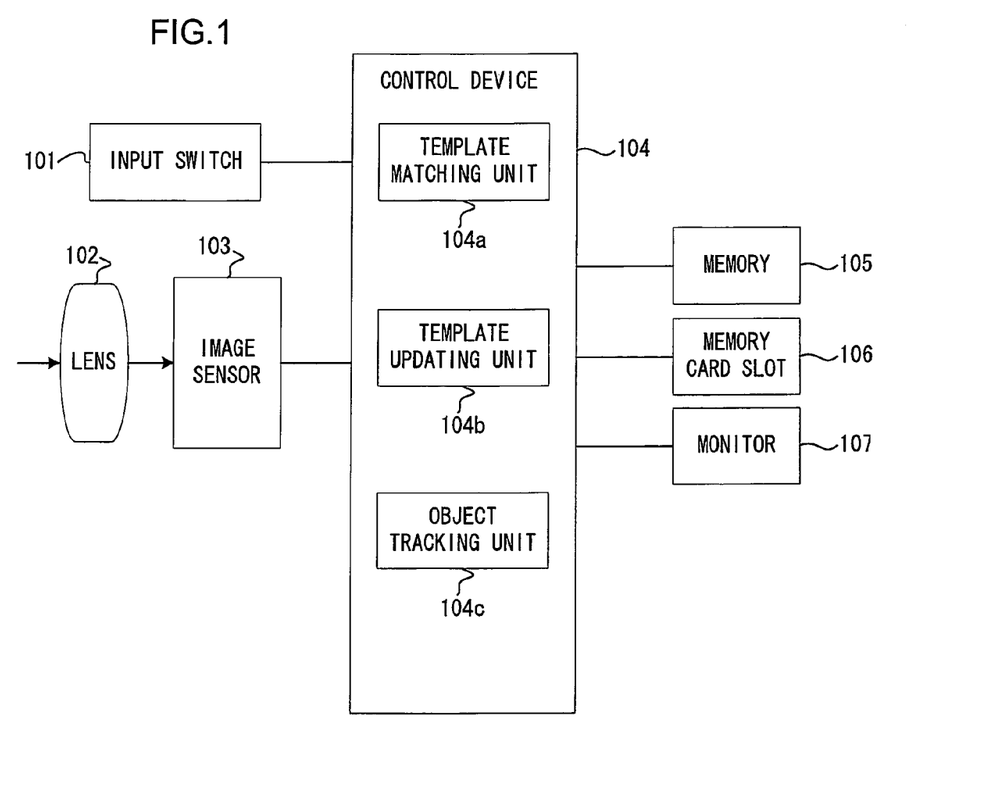
FIG. 1
A block diagram that shows a structure of one embodiment in which a camera is used as an object-tracking device.

FIG. 1 is a block diagram that shows a structure of one embodiment in which a camera is used as an object-tracking device in the first embodiment. A camera 100 is equipped with an input switch 101, a lens 102, an image sensor 103, a control device 104, a memory 105, a memory card slot 106, and a monitor 107.

The input switch 101 includes a variety of input members that are to be operated by a user. The input switch 101, for example, includes a release switch and a variety of manual operation buttons for operating the digital camera 100.

The lens 102 is composed of a plurality of optical lenses actually, while one lens represents the plurality of them in FIG. 1. The image sensor 103, for example a CCD, captures an object image which is input through the lens 102, and outputs the image data thus obtained to the control device 104. The image sensor 103 of the camera 100 in the first embodiment captures an object image as a user presses down the release button that is included in the input switch 101. Hereat, an image of one frame at the time of pressing down the release button can be imaged as a still image. A moving image can also be achieved by continuous imaging of a plurality of frames of an object image at specified time intervals between pressing down the release button and doing the same again.

The control device 104, which is composed of a CPU, a memory, and other peripheral circuits, outputs the image data (still image data or moving image data) that are input through the image sensor 103 to the monitor 107 to display, and saves the image data into a memory card inserted in the memory card slot 106.

The control device 104 functionally includes a template matching unit 104a, a template updating unit 104b, and an object tracking unit 104c. When moving images are input from the image sensor 103, these units perform processing to, across frames, track an object which exists in each image of frame that makes up a moving image. Results of the tracking are used for performing processing that requires to track the object across frames, for example, processing of the automatic focusing function (AF function), processing of the automatic exposure function (AE function), etc. of the camera 100. Object tracking processing across frames when moving images are input from the image sensor 103 is described hereafter.

The template matching unit 104a performs a matching operation of a plurality of template images, which are used as a standard in template matching processing, with image data (target image) of each frame input chronologically from the image sensor 103. Methods as cross-correlation method or sequential similarity detection algorithm are applicable. Further description is skipped herein since template matching methods are known.

The template matching unit 104a sets a rectangular area for matching with template images as a target region on a target image, moves the target region's position in the target image by a predetermined amount, for example, 1 pixel, to calculate similarity between images of the target region at each position and the template images. The template matching unit 104a, then, performs template matching processing to the whole region of the target image, and extracts a specific region of the target image having the highest similarity with the template image, that is, the rectangular area.

By tracking the region that is extracted by the template matching unit 104a across the frames, the object tracking unit 104c enables to track the tracking target object in moving images input from the image sensor 103.

In the first embodiment, a plurality of images that an object to be tracked is imaged at different times are used as template images. The object to be tracked is supposed to have been imaged by a user for preparation in advance. In concrete terms, images, for example, of a human face or a certain object, that have been imaged at different times are provided as images of a main object to be included in moving images input from the image sensor 103.

Figure 2:
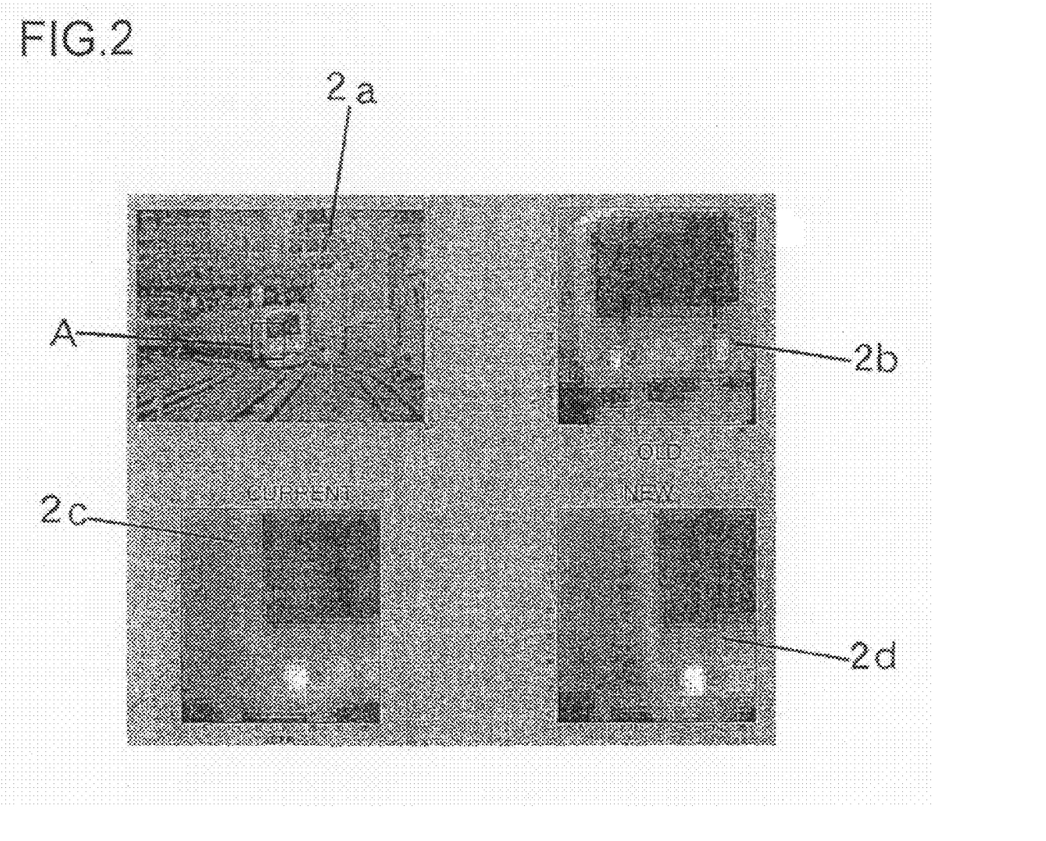
FIG. 2
A figure that shows actual examples of a target image and template images in the first embodiment.

As shown in FIG. 2, for example, when motion of a train of a target image 2a is to be tracked between frames, a user prepares, in advance, three images 2b to 2d that the object, that is, the train, has been imaged at different times, as template images. Hereat, among the template images 2b to 2d, which have been imaged at different times, the template image 2b that was imaged first, the template image 2c that was imaged next, and the template image 2d that was imaged most recently are designated as "OLD", "CURRENT", and "NEW" respectively.

In template update processing by the template updating unit 104b described hereinafter, "OLD", "CURRENT", and "NEW" are expediential titles for the purpose of clarifying a target of update. Each template's title is not necessarily to be considered limited to the above mentioned titles. A role of each template image of "OLD", "CURRENT", and "NEW" in template update processing is described hereinafter.

If a plurality of images that the object has been imaged at different times can not be prepared as the template images in advance, a plurality of pseudo template images may be created using one image that the object has been imaged. For example, a plurality of pseudo template images may be created by either enlarging or reducing the one image that the object has been imaged; or, a plurality of pseudo template images may be created by changing density of the one image that the object has been imaged.

When a plurality of pseudo template images are created by either enlarging or reducing one image that the object has been imaged, the one image itself that the object has been imaged is designated as "CURRENT". An image that "CURRENT" is either enlarged or reduced at predefined magnification is designated as "OLD". And, an image that "CURRENT" is either enlarged or reduced at different magnification from "OLD" is designated as "NEW".

When a plurality of pseudo template images are created by changing density of the one image that the object has been imaged, the one image itself that the object has been imaged is designated as "CURRENT". An image that "CURRENT" is lightened is designated as "OLD". And, an image that "CURRENT" is darkened is designated as "NEW". A plurality of pseudo template images may be created by other method than the above described method.

In response to moving image data being input from the image sensor 103, the template matching unit 104a designates an image of each frame as a target image 2a, and performs matching processing of the target image 2a with each of the three template images, that is, "OLD", "CURRENT", and "NEW" so as to carry out the template matching. When a target region is, for example, in a position of a target region A shown in FIG. 2, the template matching unit 104a performs template matching processing of the image within the target region A at that time with "OLD" 2b, "CURRENT" 2c, and "NEW" 2d.

The template matching unit 104a performs template matching processing for the whole of the target image 2a so as to detect a target region having the highest similarity with "OLD" 2b, a target region having the highest similarity with "CURRENT" 2c, and a target region having the highest similarity with "NEW" 2d, respectively in the target image 2a. The template matching unit 104 a then selects the template image having the highest similarity with the target region among the detection results as a selected template image, and extracts the target region at that time as a matched region.

In case that an object to be tracked in moving image data is a moving object, the shape of the moving object recorded changes between frames. If the prepared template images are used continuously, the similarity between each of the template images and the images within the target region gradually degrades as the shape of the object changes. Consequently, the accuracy of object-tracking performed by the object tracking unit 104c is likely to degrade gradually.

Therefore, the template updating unit 104b updates sequentially the template images in response to the motion of the object to improve the accuracy of the template matching by the template matching unit 104a even if the shape of the object changes continuously, so that the object tracking unit 104c can track an object with high accuracy. The template updating unit 104b performs following template update processing in particular.

Namely, the template updating unit 104b updates at least one template image among the template images of "OLD", "CURRENT", and "NEW" based on the results of the template matching processing performed by the template matching unit 104a. As described above, the images that have been imaged or the pseudo images that have been created are designated as each of the template images of "OLD", "CURRENT", and "NEW" at the beginning of the processing; however, the template images will be replaced by following template images shown in (a) to (c) through the template update processing, and will be updated sequentially.

(A) "CURRENT" (Current Template Image)
The selected template image that was selected at the most recent template update is designated as "CURRENT".

(B) "OLD" (Previously Selected Template Image)
The template image that had been designated as "CURRENT" until the (A) "CURRENT" was designated at the most recent template update is designated as "OLD". In other words, "CURRENT" of one generation ago is designated as "OLD".

(C) "NEW" (New Template Image)
The image within the target region that has been determined to have the highest similarity with the template image that was designated as "CURRENT" on the target image 2a at the most recent template update, that is to say, the image within the matched region that is described above, is imported and designated as "NEW".

The template updating unit 104b updates images that satisfy conditions (A) to (C) as each template image, only if the result of the template matching processing by the template matching unit 104a satisfies predetermined conditions that will be described below. Concretely, update processing of the template images are performed as described in the following (a) to (c).

(a) Processing when the target region having the highest similarity with "CURRENT" in the target image 2a is extracted as the above mentioned matched region, as the result of the template matching processing by the template matching unit 104a (Processing when "CURRENT" is selected as the selected template image)

In this case, the template updating unit 104b keeps the settings of each of the template images of "OLD", "CURRENT", and "NEW", without updating the template image. That is, the template image that was determined to have the highest similarity at the time of the last template update is still determined to have the highest similarity; therefore, the template image is not updated since update of the template images is determined not to be needed because the object has little motion.

(b) Processing when the target region having the highest similarity with "OLD" in the target image 2a is extracted as the matched region, as the result of the template matching processing by the template matching unit 104a (Processing when "OLD" is selected as the selected template image)

In this case, the template updating unit 104b determines whether or not "OLD" is consecutively selected predetermined number of times or more, for example, 7 times or more; and, whether or not an average value of similarity while "OLD" is repeatedly selected is more than a predetermined value of similarity, for example, 0.8 or more, provided that the similarity value that represents full-matching is 1 and the similarity value that represents not-matching is 0. If the above mentioned update conditions are considered not to be satisfied, the template updating unit 104b keeps the settings of each of the template images of "OLD", "CURRENT", and "NEW", without updating the template images.

On the other hand, if the above mentioned update conditions are considered to be satisfied, the template updating unit 104b updates the template images as follows: the template image that has been designated as "OLD" is designate as "CURRENT", while the template image that has been designated as "CURRENT" is designate as "OLD". This enables the template image that has been determined to have the highest similarity to be designated as "CURRENT", and enables "CURRENT" of one generation ago to be designated as "OLD". At the same time, the template updating unit 104b imports the image within the target region that has been determined to have the highest similarity with the pre-update "OLD" on the target image 2a at the time, that is, the image within the matched region, and designates the imported image as "NEW".

(c) Processing when the target region having the highest similarity with "NEW" in the target image 2a is selected as the matched region, as the result of the template matching processing by the template matching unit 104a (Processing when "NEW" is selected as the selected template image)

In this case, the template updating unit 104b determines whether or not "NEW" is consecutively selected a predetermined number of times or more, for example, 7 times or more; and, whether or not an average value of similarity while "NEW" is repeatedly selected is more than a predetermined value of similarity, for example, 0.8 or more. If the above mentioned update condition is considered not to be satisfied, the template updating unit 104b keeps the settings of each of the template images of "OLD", "CURRENT", and "NEW", without updating the template images.

On the other hand, if the above mentioned update condition is considered to be satisfied, the template updating unit 104b updates the template images as follows: the template image that has been designated as "NEW" is designate as "CURRENT", while the template image that has been designated as "CURRENT" is designate as "OLD". This enables the template image that has been determined to have the highest similarity to be designated as "CURRENT", and enables "CURRENT" of one generation ago to be designated as "OLD". At the same time, the template updating unit 104b imports the image within the target region that has been determined to have the highest similarity with the pre-update "NEW" on the target image 2a at the time, that is, the image within the matched region, and designates the imported image as "NEW".

As described above, updating the template images enables template matching processing to be performed with high accuracy in correspondence with change of the shape of the object accompanied by the motion of the object. The template images are updated only if either "OLD" or "NEW" is consecutively selected the predetermined number of times or more and an average value of similarity of each selection is more than the predetermined value of similarity. Consequently, update frequency of the template images is reduced, and stable template matching processing is made possible, compared to the conventional method that the template images are updated for each frame.

With respect to a moving image that is made up with still images of 600 frames, for example, updating the template images for each frame using the conventional method accompanies 600 updates of the template images; meanwhile, using the method of the embodiment enables the number of updating the template images to be reduced to 30 approximately. Thus, processing load can be reduced.

Figure 3:
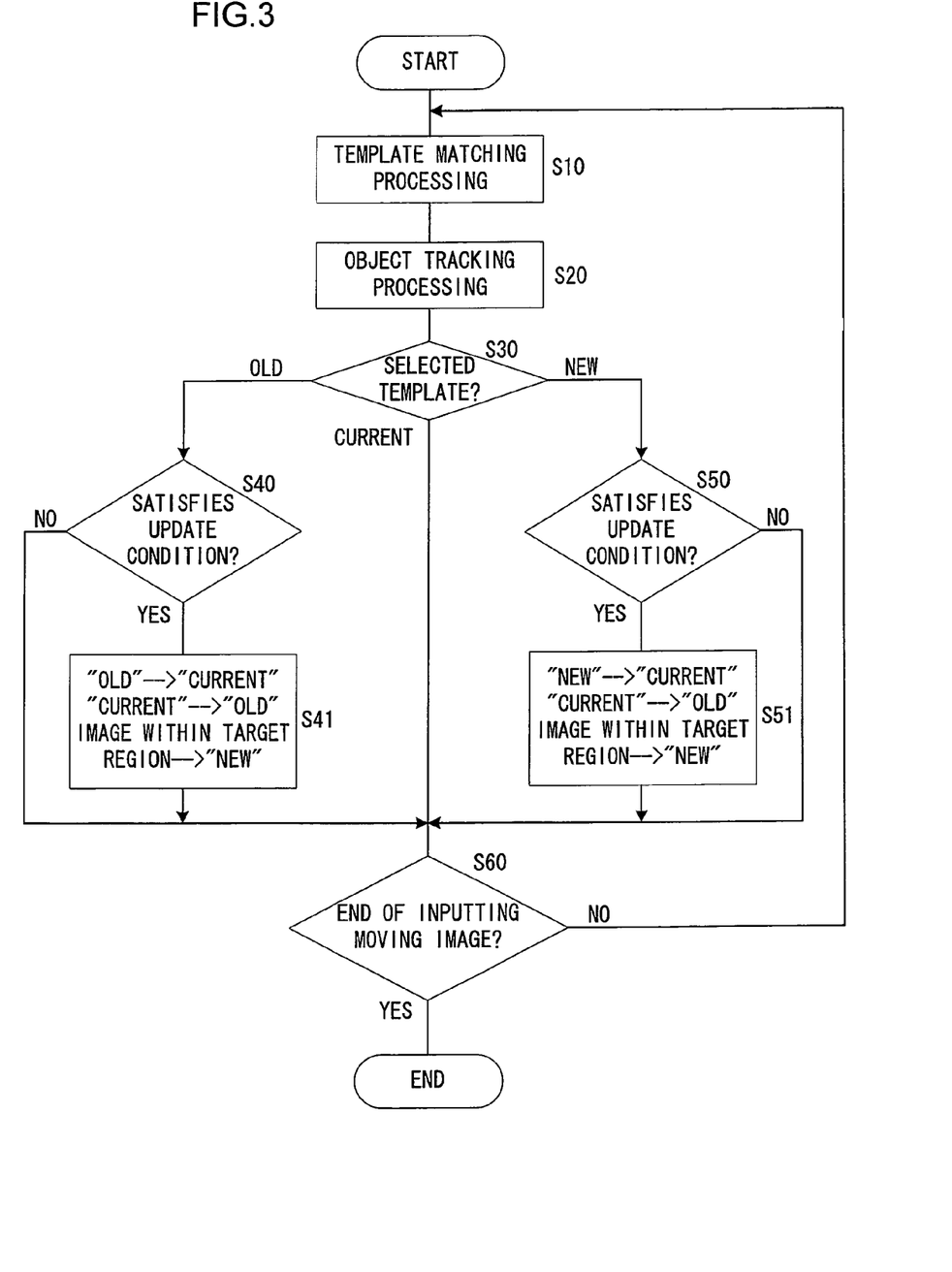
FIG. 3
A flow chart that shows processing executed in the camera according to the first embodiment.

FIG. 3 is the flow chart that shows the processing executed in the camera 100 according to the first embodiment. The processing shown in FIG. 3 is performed by the control device 104 by running an object-tracking program that is to be started as the user operates the input switch 101 to start shooting a moving image.

At a step S10, as the result of template matching processing of the images within the target region to each of the template images of "OLD", "CURRENT", and "NEW" by moving the target region in the target image 2a as described above, the template matching unit 104a selects the template image having the highest similarity as the selected template, and extracts the target region having the highest similarity with the selected template in the target image 2a as a matched region. Then, the operation proceeds to a step S20.

At the step S20, the object tracking unit 104c performs tracking of the object based on the matched region of a previous frame and the matched region of a current frame in the moving image; and the operation proceeds to a step S30. At the step S30, as the result of the template matching processing by the template matching unit 104a, the template updating unit 104b identifies the selected template image as which of either "OLD", "CURRENT", or "NEW". If the selected template image is identified as "CURRENT", the template image is not updated. Then, the operation proceeds to a step S60 as described below.

Meanwhile, if the selected template image is identified as "OLD", the operation proceeds to a step S40. At the step S40, the template updating unit 104b determines whether or not the update condition that, as described above, "OLD" is consecutively selected the predetermined number of times or more, for example, 7 times or more, and that the average value of similarity of each selection is more than the predetermined value of similarity, for example, 0.8 or more, is satisfied. If the update condition is considered not to be satisfied, the template images are not updated. Then, the operation proceeds to the step S60.

On the other hand, if the update condition is considered to be satisfied, the operation proceeds to a step S41. The template updating unit 104b designates the template image that has been designated as "OLD" as "CURRENT", designates the template image that has been designated as "CURRENT" as "OLD", and imports the image within the matched region and designates the imported image as "NEW". Then, the operation proceeds to the step S60.

If the selected template image is identified as "NEW", the operation proceeds to a step S50. At the step S50, the template updating unit 104b determines whether or not the update condition that, as described above, "NEW" is consecutively the selected predetermined number of times or more, for example, 7 times or more, and that the average value of similarity of each selection is more than the predetermined value of similarity, for example, 0.8 or more, is satisfied. If the update condition is considered not to be satisfied, the template images are not updated, and the operation proceeds to the step S60 as described below.

On the other hand, if the update condition is considered to be satisfied, the operation proceeds to a step S51. The template updating unit 104b designates the template image that has been designated as "NEW" as "CURRENT", designates the template image that has been designated as "CURRENT" as "OLD", and imports the image within the matched region and designates the imported image as "NEW". Then, the operation proceeds to the step S60.

At the step S60, whether or not inputting the moving image data from the image sensor 103 has completed is determined. If inputting the moving image data is determined to have not completed, the operation returns to the step S10 and repeats the processing. On the other hand, if inputting the moving image data is determined to have completed, the processing terminates.

In accordance with the first embodiment, which is described above, the following operational effects can be achieved.

(1) Preparing a plurality of template images that are used for the template matching processing allows each template image to be updated depending on the template matching results. This enables the template matching processing to be performed with high accuracy in response to changes in the shape of the object attributable to the motion of the object.

(2) The template images are allowed to be updated only if either "OLD" or "NEW" is consecutively selected the predetermined number of times or more and the average value of similarity of each selection is more than the predetermined value of similarity. Consequently, update frequency of the template images is reduced, and the stable template matching processing is made possible, compared to, for example, the conventional method that the template images are updated for each frame.

(3) If a plurality of images that an object has been imaged at different times cannot be prepared as template images in advance, a plurality of pseudo template images may be created using one image that the object has been imaged. Consequently, even if a plurality of template images that the object has been imaged at different times can not be prepared, the template matching processing of the invention enables to track the object.

Second Embodiment

In the second embodiment, in addition to the three template images, that is, "CURRENT", "OLD", and "NEW", which are described above in the first embodiment, "INITIAL", which is a template image that has been obtained before these three are obtained, is used as the object template for the template matching. In other words, in addition to the three template images that are shown in FIG. 2, the template image that has been imaged before the template image of "OLD" is imaged is designated as "INITIAL". The template image of "INITIAL" is not subject to the update processing by the template updating unit 104b. That is, the template updating unit 104b treats the template image of "INITIAL" as a fixed template image (non-update template image), which is not supposed to be updated. The block diagram shown in FIG. 1 is common between the first embodiment and the second embodiment, therefore the description for the block diagram is skipped here.

Figure 4:
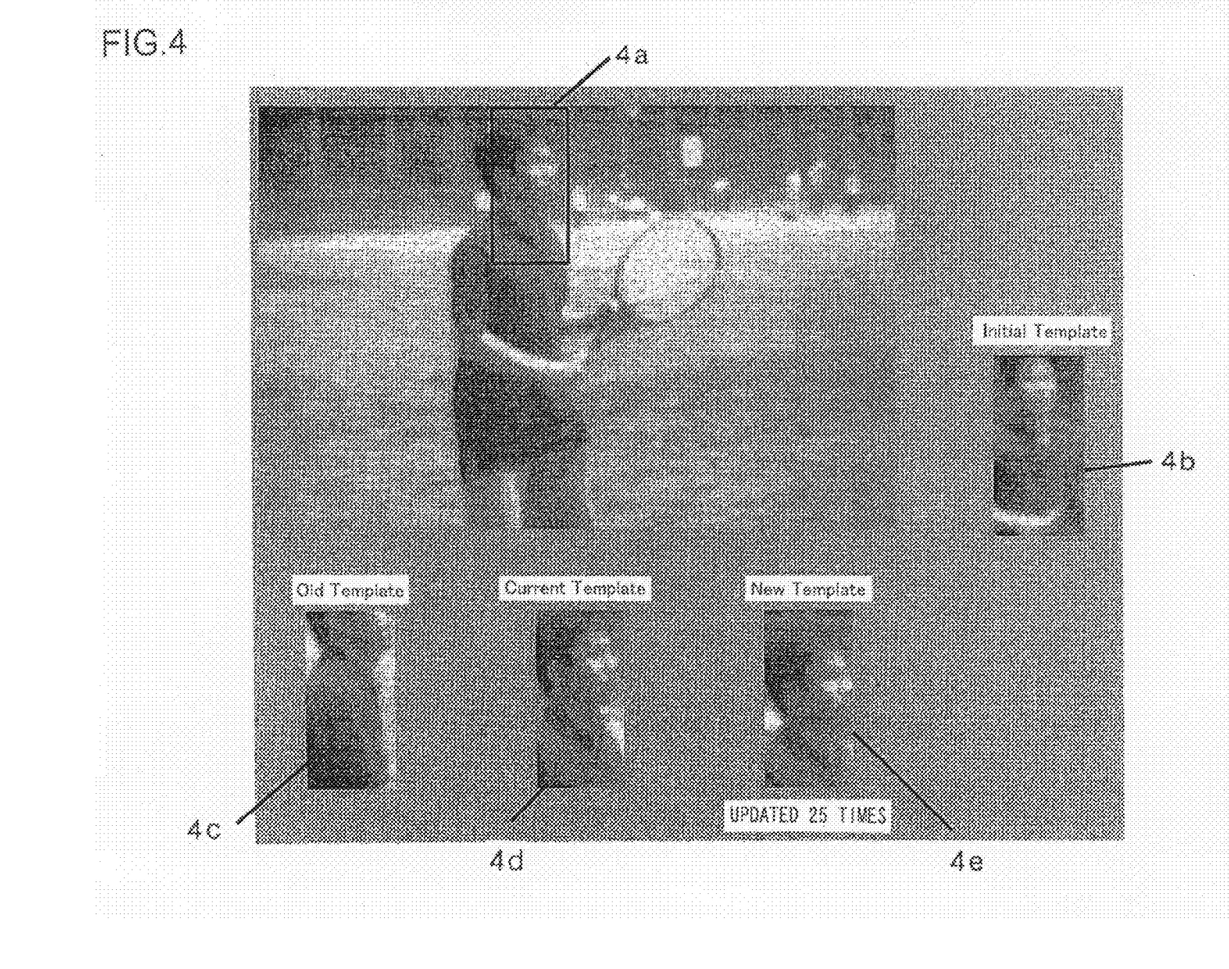
FIG. 4
A figure that shows actual examples of a target image and template images in a second embodiment.

FIG. 4 is the figure that shows a concrete example of a target image and template images in the second embodiment. As shown in FIG. 4, when motion of a person of a target image 4a is to be tracked between frames, the user prepares, in advance, four images 4b to 4e that the object, that is, the person, has been imaged at different times, as template images. Hereat, among the template images 4b to 4e, which have been imaged at different times, the template image 4b that was imaged first, the template image 4c that was imaged next, the template image 4d that was imaged subsequently, and the template image 4e that was imaged most recently are designated as "INITIAL", "OLD", "CURRENT", and "NEW" respectively.

If a plurality of images that the object has been imaged at different times can not be prepared as the template images in advance, a plurality of pseudo template images may be created using one image that the object has been imaged, as in the first embodiment. For example, a plurality of pseudo template images may be created by either enlarging or reducing the image that the object has been imaged; or, a plurality of pseudo template images may be created by changing density of the image that the object has been imaged.

The template matching unit 104a performs the matching processing of the target image 4a to each of the target images as in the first embodiment, using the four template images, that is, "INITIAL", "OLD", "CURRENT", and "NEW". And, as described below, the template updating unit 104b performs the update processing of each of the template images other than the template image of "INITIAL", which is the non-update template.

Figure 5:
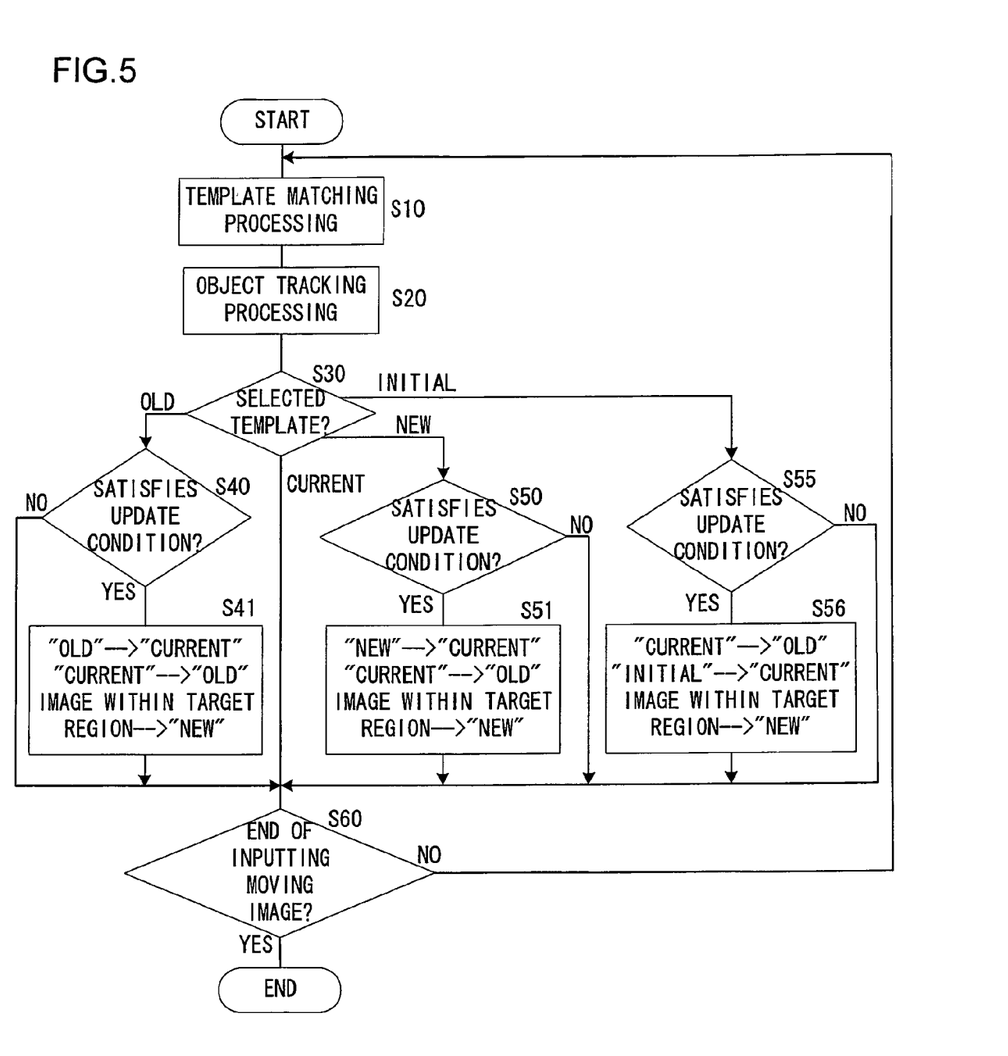
FIG. 5
A flow chart that shows processing executed in the camera according to the second embodiment.

FIG. 5 is the flow chart that shows the processing executed in the camera 100 in the second embodiment. The processing shown in FIG. 5 is performed by the control device 104 by running an object-tracking program that is to be started as the user operates the input switch 101 to start shooting a moving image. In FIG. 5, the same steps of the processing as those in FIG. 3 that is described above in the first embodiment are numbered the same way. Description of those steps will be skipped, meanwhile differences will be focused hereinafter.

At a step S30, as the result of the template matching processing by the template matching unit 104a, the template updating unit 104b identifies the selected template image as which of either "INITIAL", "OLD", "CURRENT", or "NEW". If the selected template image is identified as "INITIAL", the operation proceeds to a step S55.

At the step S55, as the step S40 and the step S50 described above in the first embodiment, the template updating unit 104b determines whether or not the update condition that, "INITIAL" is consecutively selected the predetermined number of times or more, for example, 7 times or more, and that the average value of similarity of each selection is more than the predetermined value of similarity, for example, 0.8 or more, is satisfied. If the update condition is considered not to be satisfied, the template images are not updated, and the operation proceeds to the step S60. On the other hand, if the update condition is considered to be satisfied, the operation proceeds to the step S56.

At the step S56, the template updating unit 104b designates the template image that has been designated as "CURRENT" as "OLD", designates the template image that has been designated as "INITIAL" as "CURRENT", and imports the image within the matched region and designates the imported image as "NEW". The template image of "INITIAL" is not updated. Then, the operation proceeds to the step S60.

In accordance with the second embodiment, which is described above, in addition to the operational effects in the first embodiment the following operational effects can be achieved. Namely, designating the template image of "INITIAL" as the fixed template that is not supposed to be updated enables avoidance of accumulation of erroneous information that tends to occur in the dynamic update processings of template images.

—Modification—

The camera in the embodiments described above is modifiable as follows.

(1) In the first embodiment described above, an example of using the three template images of "OLD", "CURRENT", and "NEW" is described. In the second embodiment, an example of using the four template images of "INITIAL", "OLD", "CURRENT", and "NEW" is described. However, the number of template images is not necessarily limited to those of the above embodiments, but is allowed to be two, five, or more. In the case that the number of the template images is two, the processing described above may be performed using only "OLD" and "CURRENT". For example, if "OLD" is selected and the update condition is satisfied, the template image that has been designated as "OLD" is designated as "CURRENT", and the image within the target region is designated as "OLD". On the other hand, if "CURRENT" is selected, the template image is not updated. In the case that the number of the template images is five or more, the number of "OLD" may be increased and "CURRENT" of a plurality of generations ago may be used as the template image.

(2) In the first embodiment and the second embodiment described above, an example that the template updating unit 104b determines, as the update condition of the template images, whether or not either "OLD" or "NEW" is consecutively selected the predetermined number of times or more, for example, 7 times or more; and whether or not an average value of similarity of each selection is more than the predetermined value of similarity, for example, 0.8 or more is described. However, an update condition of the template images is not limited to the one described in the above example. The template updating unit 104b may as well be configured to determine whether or not either "OLD" or "NEW" is consecutively selected predetermined number of times or more, and whether or not each value of similarity of each selection is more than the predetermined value of similarity. Also, the template updating unit 104b may as well be configured to perform the update of the template images, only under the condition that either "OLD" or "NEW" is consecutively selected the predetermined number of times or more.

(3) In the first embodiment and the second embodiment described above, an example of performing the processing on the moving image data that is input from the image sensor 103, in other words, image data of a plurality of frames that is input in chronological order is described. However, performing of processing is not limited to the one that is described above. In the case that a plurality of frames of still images are input in chronological order by the continuous photography, the present invention may also be applicable to the object-tracking between the frames.

(4) In the first embodiment and the second embodiment described above, an example that if the update condition of the template images is considered to be satisfied, the template updating unit 104b updates the template images by exchanging "CURRENT" and either of "OLD" or "NEW" depending on the condition is described. However, update of the template images is not limited to the one described above. Update of the template images may as well be performed by writing post-update template images over only a predetermined proportion of pixels of corresponding pixels to pre-update template images. For example, update of the template images may as well be performed by adding m % of all the pixels of "CURRENT" and (100-m) % of all the pixels of "OLD", instead of designating the template image that has been designated as "OLD" as "CURRENT".

(5) In the first embodiment and the second embodiment described above, an example of using the camera 100 as an object-tracking device, and performing the object-tracking program using the control device 104 with which the camera 100 is equipped is described. However, other devices may as well be used as object-tracking devices. The object-tracking may as well be performed, for example, using a personal computer as an object-tracking device, storing the object-tracking program on a recording medium like a hard disk drive with which the personal computer is equipped, and allowing CPU to load the object-tracking program on a memory and to execute the object-tracking program. Also, a security device (a monitoring device) that is used for monitoring facilities may as well be used as an object-tracking device.

Figure 6:
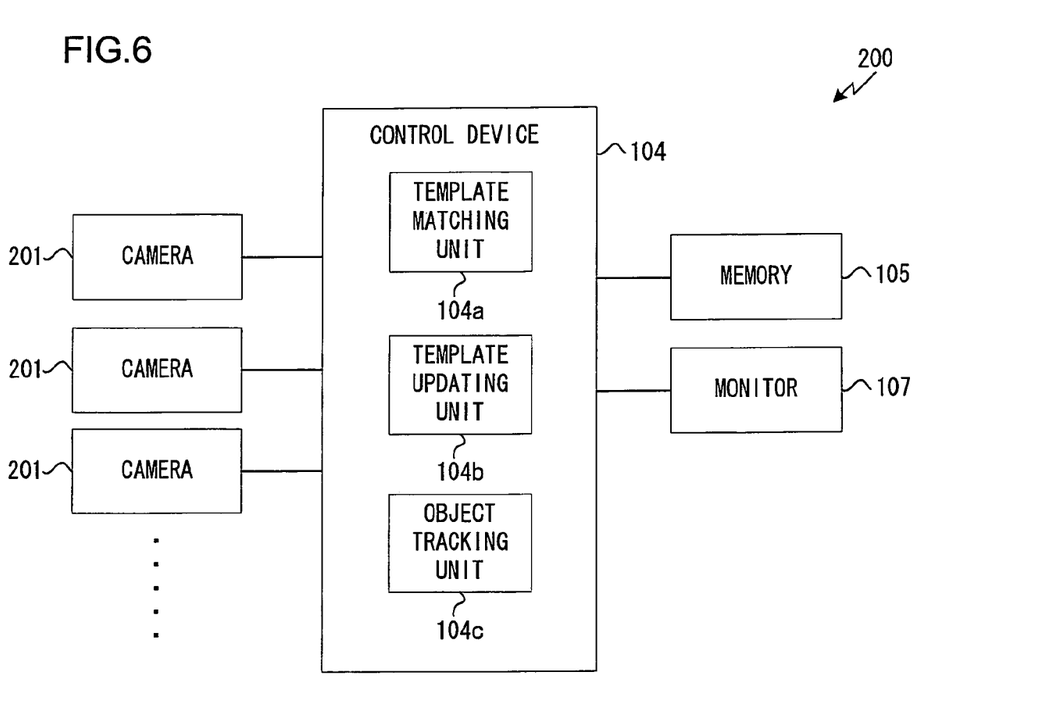
FIG. 6
A block diagram that shows a structure of one embodiment in which a security device is used as an object-tracking device.

As shown in FIG. 6, for example, a security device 200 with which a plurality of cameras 201, the control device 104, the memory 105, and the monitor 107 are equipped is used. The control device 104, as in the first embodiment and the second embodiment described above, may as well be configured to execute the object-tracking program to perform the object-tracking between the images of each of the frames that are input from the cameras 201 in chronological order, and to identify a suspicious individual who breaks into facilities. Hereat, a plurality of the monitor 107 may as well be provided to perform monitoring using the plurality of the monitor 107. Instead, a camera-equipped cell phone or other devices are allowed to be used as the object-tracking device.

Figure 7:
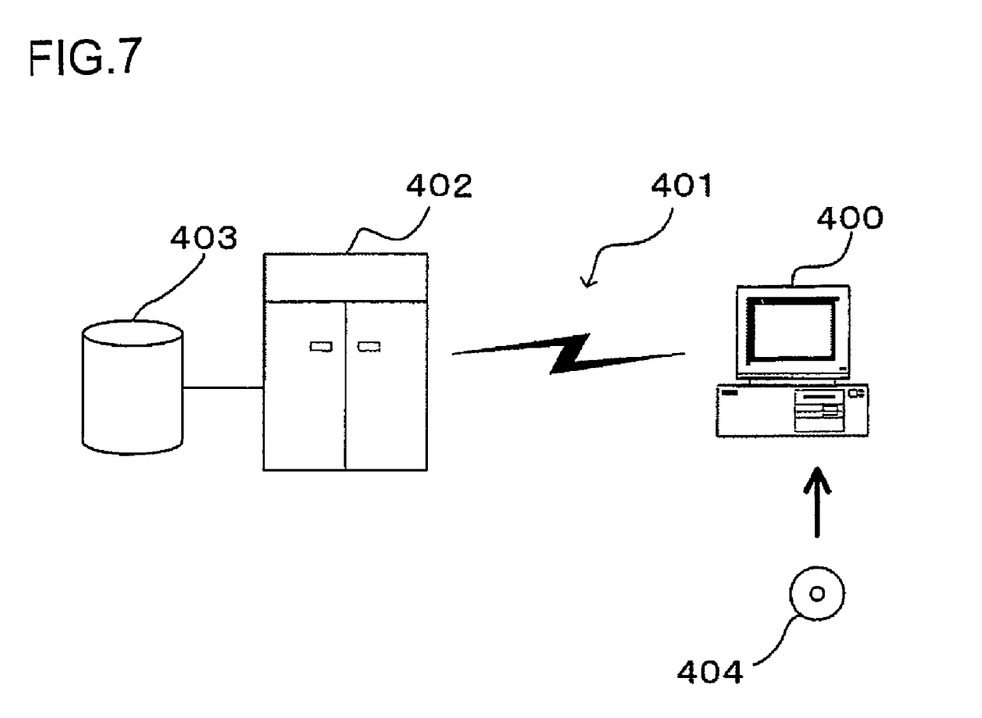
FIG. 7
A figure that shows the object-tracking program being provided to the object-tracking device.

(6) In the case that the object-tracking program described above are applied to a personal computer, etc., the object-tracking program described above can be provided through a recording medium as a CD-ROM, or data signal as the Internet, as shown in FIG. 7. A personal computer 400 is provided with the program through a CD-ROM 404. The personal computer 400 has a connect function to a communication line 401. A computer 402, which is a server computer that provides the object-tracking program described above, stores the object-tracking program on a recording medium such as a hard disk 403. The communication line 401 is a communication line such as the Internet or a personal computer communication, or a leased line, etc. The computer 402 reads out the object-tracking program using the hard disk 403, sends the object-tracking program to the personal computer 400 through the communication line 401. In other words, the object-tracking program is embodied on a carrier wave as a data signal, and is sent through the communication line 401. Thus, the object-tracking program can be provided as a computer-readable computer program product in a variety of forms such as recording medium, a carrier wave, etc.

While preferred embodiments and modifications of the invention have been described, the invention is not to be limited to those specific embodiments and modifications. Various modifications can be made without departing from the scope of the invention.

The disclosures of the following priority applications are herein incorporated by reference:

Japanese Patent Application No. 2006-054394 filed Mar. 1, 2006

Japanese Patent Application No. 2006-292149 filed Oct. 27, 2006

The invention claimed is:

1. A non-transitory computer-readable storage medium that stores a computer-executable program for tracking motion of an object between images of a plurality of frames that are input in chronological order, the program comprising instructions for:

template matching, wherein template matching of each frame of an input image to a plurality of template images is performed, a template image having a highest similarity with an image within a predetermined region of the input image is selected as a selected template among the plurality of template images and the predetermined region of the input image is extracted as a matched region;

object-tracking, wherein, with reference to an image within the matched region that is extracted in the step of template-matching, by tracking motion between frames, motion of an object is tracked between the images of the plurality of frames;

determining as to whether or not a result of matching in the step of template-matching satisfies an update condition for updating the plurality of template images; and updating, in a case that the update condition is determined to be satisfied in the step of determining, at least one of the plurality of template images;

wherein:

the plurality of template images comprises a current selected template image that was selected as the selected template image when the plurality of template images were updated in the step of updating, a former selected template image that had been designated as the current selected template image until the plurality of template were updated in the step of updating, and a new template image which is an image within the matched region at a time that the plurality of template images were updated in the step of updating, and in the step of determining, it is determined as the update condition that one of the former selected template image and the new template image is consecutively selected a predetermined number of times or more as the selected template image.

2. The non-transitory computer-readable storage medium according to claim 1, wherein:

the plurality of template images are three template images that include each one of the current selected template image, the former selected template image, and the new template image.

3. The non-transitory computer-readable storage medium according to claim 1, wherein:

in the step of updating, only a predetermined proportion of pixel values among all pixel values of each template image is to be updated.

4. An object-tracking device, comprising:

a program execute unit that executes a program that is stored in the non-transitory computer-readable storage medium according to claim 1.

5. A camera, comprising:

an imaging unit that images an object to obtain an image, and a program execute unit that executes a program that is stored in the non-transitory computer-readable storage medium according to claim 1, wherein:

the program execute unit executes the program such that motion of the object is tracked between images of a plurality of frames that are obtained by imaging the object by the imaging unit and are input in chronological order.

6. A non-transitory computer-readable storage medium that stores a computer-executable program for tracking motion of an object between images of a plurality of frames that are input in chronological order, the program comprising instructions for:

template matching, wherein template matching of each frame of an input image to a plurality of template images is performed, a template image having a highest similarity with an image within a predetermined region of the input image is selected as a selected template among the plurality of template images and the predetermined region of the input image is extracted as a matched region;

object-tracking, wherein, with reference to an image within the matched region that is extracted in the step of template-matching, by tracking motion between frames, motion of an object is tracked between the images of the plurality of frames;

determining as to whether or not a result of matching in the step of template-matching satisfies an update condition for updating the plurality of template images; and updating, in a case that the update condition is determined to be satisfied in the step of determining, at least one of the plurality of template images;

wherein:

the plurality of template images comprises a current selected template image that was selected as the selected template image when the plurality of template images were updated in the step of updating, a former selected template image that had been designated as the current selected template image until the plurality of template were updated in the step of updating, and a new template image which is an image within the matched region at a time that the plurality of template images were updated in the step of updating, and in the step of determining, it is determined as the update condition that, when one of the former selected template image and the new template image is consecutively selected a predetermined number of times or more as the selected template image, either that values of similarity at that time are all equal to or greater than a predetermined value of similarity or that an average value of similarity at that time is equal to or greater than a predetermined value of similarity.

7. The non-transitory computer-readable storage medium according to claim 6, wherein:

the plurality of template images are three template images that include each one of the current selected template image, the former selected template image, and the new template image.

8. The non-transitory computer-readable storage medium according to claim 6, wherein:

in the step of updating, only a predetermined proportion of pixel values among all pixel values of each template image is to be updated.

9. An object-tracking device, comprising:

a program execute unit that executes a program that is stored in the non-transitory computer-readable storage medium according to claim 6.

10. A camera, comprising:

an imaging unit that images an object to obtain an image, and a program execute unit that executes a program that is stored in the non-transitory computer-readable storage medium according to claim 6, wherein:

the program execute unit executes the program such that motion of the object is tracked between images of a plurality of frames that are obtained by imaging the object by the imaging unit and are input in chronological order.

11. A non-transitory computer-readable storage medium that stores a computer-executable program for tracking motion of an object between images of a plurality of frames that are input in chronological order the program comprising instructions for:

template matching, wherein template matching of each frame of an input image to a plurality of template images is performed, a template image having a highest similarity with an image within a predetermined region of the input image is selected as a selected template among the plurality of template images and the predetermined region of the input image is extracted as a matched region;

object-tracking, wherein, with reference to an image within the matched region that is extracted in the step of template-matching, by tracking motion between frames, motion of an object is tracked between the images of the plurality of frames;

determining as to whether or not a result of matching in the step of template-matching satisfies an update condition for updating the plurality of template images; and updating, in a case that the update condition is determined to be satisfied in the step of determining, at least one of the plurality of template images;

wherein:

the plurality of template images comprises a current selected template image that was selected as the selected template image when the plurality of template images were updated in the step of updating, a former selected template image that had been designated as the current selected template image until the plurality of template were updated in the step of updating, a new template image which is an image within the matched region at a time that the plurality of template images were updated in the step of updating, and a non-update template image to be not updated in the step of updating, which was obtained first among the plurality of template images, and in the step of determining, it is determined as the update condition that, when one of the former selected template image, the new template image, and the non-update template image is consecutively selected a predetermined number of times or more as the selected template image, either that values of similarity at that time are all equal to or greater than a predetermined value of similarity or an average value of similarity at that time is equal to or greater than a predetermined value of similarity.

12. The non-transitory computer-readable storage medium according to claim 11, wherein the plurality of template images are four template images that include each one of the current selected template image, the former selected template image, the new template image, and the non-update template image.

13. The non-transitory computer-readable storage medium according to claim 11, wherein:

in the step of updating, only a predetermined proportion of pixel values among all pixel values of each template image is to be updated.

14. An object-tracking device, comprising:

a program execute unit that executes a program that is stored in the non-transitory computer-readable storage medium according to claim 11.

15. A camera, comprising:

an imaging unit that images an object to obtain an image, and a program execute unit that executes a program that is stored in the non-transitory computer-readable storage medium according to claim 11, wherein:

the program execute unit executes the program such that motion of the object is tracked between images of a plurality of frames that are obtained by imaging the object by the imaging unit and are input in chronological order.

* * * * *